Patented June 28, 1932

1,864,662

UNITED STATES PATENT OFFICE

ERNEST B. MILLER, OF BALTIMORE, MARYLAND, ASSIGNOR TO THE SILICA GEL CORPORATION, OF BALTIMORE, MARYLAND, A CORPORATION OF MARYLAND

PLASTIC COMPOSITION

No Drawing. Application filed November 20, 1930. Serial No. 497,067.

The present application which is a continuation in part of my application Serial No. 228,692, filed October 26, 1927, relates to plastic compositions, and more particularly to such compositions containing rubber and a finely divided siliceous material, as for example silica gel.

It is customary in the manufacture of rubber articles to incorporate with the rubber a filling material in order to give the article certain properties such as elasticity, mechanical strength, resistance to wear and pressure, and chemical inertness. A material to be suitable for this purpose must possess the properties of being insoluble in water, chemically inert with respect to the rubber, and capable of being unaffected by heat except at high temperatures, and besides must be in an extremely fine state of subdivision. One of the materials which has been proposed for this purpose is colloidal silicic acid of a specific gravity of 1.64, the flocculent voluminous precipitate which forms immediately upon the addition of an acid to a silicate solution.

It has been found that incorporating an inorganic gel such as silica gel in a finely divided state in rubber, the rubber article obtained therefrom possesses much greater elasticity and tensile strength or resistance to wear and pressure than rubber articles obtained from rubber compositions wherein colloidal silicic acid of a specific gravity of 1.64 is employed.

The plastic composition, according to the present invention may be made by incorporating powdered or pulverized silica gel in a rubber mix containing raw rubber and a vulcanizing agent such as sulphur with or without an activator such as zinc oxide and an accelerator as for example, diphenylguanidine. The relative proportions of silica gel and rubber may be varied according to whether a product richer or poorer in rubber is desired, there being no well defined limits, except that there must, of course, be sufficient rubber present to bind the particles of the silica gel. Various methods of intermixing sub-divided solid materials with rubber are well-known at the present time, and any of these may be used. Such methods do not constitute a part of this invention and are not described herein.

By "porous, highly adsorptive, inorganic gel" is meant a substance such as obtained by the process disclosed in Patent 1,297,724. It is to be understood, however, that the silica gel may be made in other ways. Silica gel is an amorphous material, and due to its pulverized condition the particles do not have any substantially sharp edges. It results, therefore, that the particles of the silica gel will not cut the rubber into which it has been incorporated.

Investigation has disclosed that articles obtained from rubber compositions containing silica gel as the filling material with or without an activator and an accelerator exhibit a greater breaking load or resistance to break and also a higher percent elongation or elasticity than do the corresponding products obtained from plastic compositions in which precipitated silicic acid of a specific gravity of 1.64 is used as the filling material. In conducting this investigation a master batch of smoked sheets of rubber consisting of 90 parts by weight of rubber and 10 parts by weight of sulphur was first prepared. Stock mixtures consisting of varying proportions of the master batch and precipitated silicic acid of a specific gravity of 1.64 were then prepared, milled, and allowed to stand for 24 hours. The stock mixtures comprised the following proportions.

| Stock | 1 | 2 | 3 | 4 |
|---|---|---|---|---|
| | Parts | Parts | Parts | Parts |
| Master batch | 90 | 80 | 60 | 40 |
| Precipitated silicic acid of 1.64 sp. gr. | 10 | 20 | 40 | 60 |

NOTE.—Parts means parts by weight.

Portions of each of the stock mixtures 1, 2, 3 and 4 were then vulcanized in a platen press at a temperature of 143° C. for 60 minutes. The other portions of said mixtures were vulcanized at the same temperature for 75 minutes. The slabs, after vulcanization, were allowed to stand for 24 hours whereupon test pieces were cut from each slab representing each cure. Each of the test pieces were then tested in a Scott testing machine for the breaking load and breaking tension or elongation. The results obtained are as follows:

| Stock | Minutes for vulcanization at 143° C. | Breaking load lbs./sq. in. | Breaking tension or elongation % |
|---|---|---|---|
| 1 | 60 | 594 lbs. | 640 |
|   | 75 | 782 | 635 |
| 2 | 60 | 611 | 400 |
|   | 75 | 740 | 425 |
| 3 | 60 | 857 | 130 |
|   | 75 | 896 | 125 |
| 4 | 60 | 418 | 40 |
|   | 75 | 750 | 25 |

Stock mixtures consisting of varying proportions of the master batch and powdered silica gel were next prepared, milled, and allowed to stand for 24 hours. The stock mixtures comprised the following proportions.

| Stock | 10 | 11 | 12 | 13 |
|---|---|---|---|---|
|  | Parts | Parts | Parts | Parts |
| Master batch | 90 | 80 | 60 | 40 |
| Silica gel | 10 | 20 | 40 | 60 |

Note.—Parts means parts by weight.

Portions of each of the stock mixtures 10, 11, 12 and 13 were then vulcanized in a platen press at a temperature of 143° C. for 60 minutes. The other portions of said mixtures were vulcanized at the same temperatures for 75 minutes. The slabs, after vulcanization, were allowed to stand for 24 hours whereupon test pieces were cut from each slab representing each cure. The test pieces were then tested in a Scott testing machine for the breaking load and breaking tension or elongation. The results obtained are so follows:

| Stock | Minutes for vulcanization at 143° C. | Breaking load lbs./sq. in. | Breaking tension or elongation % |
|---|---|---|---|
| 10 | 60 | 559 lbs. | 800 |
|    | 75 | 1429 | 795 |
| 11 | 60 | 1088 | 510 |
|    | 75 | 1332 | 525 |
| 12 | 60 | 1304 | 250 |
|    | 75 | 1571 | 230 |
| 13 | 60 | 1190 | 60 |
|    | 75 | 1224 | 60 |

Stock mixtures consisting of varying proportions of precipitated silicic acid of a specific gravity of 1.64, the master batch, an organic accelerator and an activator therefor were next prepared, milled and allowed to stand for 24 hours. The stock mixtures comprised the following proportions.

| Stock | 5 | 6 | 7 | 8 |
|---|---|---|---|---|
|  | Parts | Parts | Parts | Parts |
| Master batch | 90 | 80 | 60 | 40 |
| Precipitated silicic acid of 1.64 sp. gr. | 10 | 20 | 40 | 60 |
| Zinc oxide | 4.5 | 4 | 3 | 2 |
| Diphenylguanidine | 0.9 | 0.8 | 0.6 | 0.4 |

Note.—Parts means parts by weight.

Stock mixtures 5, 6, 7 and 8 were then treated in exactly the same manner as stock mixtures 1, 2, 3 and 4 and after vulcanization were tested for the breaking load and breaking tension or elongation. The results are as follows:

| Stock | Minutes for vulcanization at 143° C. | Breaking load lbs./sq. in. | Breaking tension or elongation % |
|---|---|---|---|
| 5 | 60 | 2041 lbs. | 625 |
|   | 75 | 985 | 475 |
| 6 | 60 | 786 | 380 |
|   | 75 | 978 | 430 |
| 7 | 60 | 760 | 120 |
|   | 75 | 891 | 125 |
| 8 | 60 | 863 | 25 |
|   | 75 | 991 | 20 |

Stock mixtures consisting of varying portions of powdered silica gel, the master batch, an organic accelerator and an activator therefor were next prepared in the same manner as described in connection with the other experiments. The stock mixture comprised the following:

| Stock | 14 | 15 | 16 | 17 |
|---|---|---|---|---|
|  | Parts | Parts | Parts | Parts |
| Master batch | 90 | 80 | 60 | 40 |
| Silica gel | 10 | 20 | 40 | 60 |
| Zinc oxide | 4.5 | 4 | 3 | 2 |
| Diphenylguanidine | 0.9 | 0.8 | 0.6 | 0.4 |

Note.—Parts means parts by weight.

Stock mixtures 14, 15, 16 and 17 were then treated in the same manner as stocks 10, 11, 12 and 13 and after vulcanization were tested for the breaking load and breaking tension or elongation. The results obtained were as follows:

| Stock | Minutes for vulcanization at 143° C. | Breaking load lbs./sq. in. | Breaking tension or elongation % |
|---|---|---|---|
| 14 | 60 | 1740 lbs. | 735 |
|    | 75 | 2050 | 760 |
| 15 | 60 | 1445 | 610 |
|    | 75 | 1699 | 620 |
| 16 | 60 | 1365 | 275 |
|    | 75 | 1532 | 260 |
| 17 | 60 | 1448 | 60 |
|    | 75 | 1500 | 70 |

Thus, articles obtained from rubber plastic compositions made according to the present invention exhibit enhanced properties as regards tensile strength and elasticity.

Although the invention has been described in connection with silica gel it is to be understood that other inorganic gels, as for example gels containing an oxide of tin, tungsten, titanium, or aluminum, or mixtures of said oxides may be used.

The term "inorganic gel" as used in the claims designates the solid, hard material having ultra-microscopic pores obtained from a dried or nearly dried jelly.

Having thus described the invention, what is claimed as new and desired to be secured by Letters Patent is:

1. A rubber composition consisting of rubber having incorporated therein a powdered, hard, porous, highly adsorptive inorganic gel selected from the group consisting of the oxides of silicon, tin, tungsten, titanium, aluminum, characterized in that it has a tensile strength and elasticity much greater than that of a similar composition containing an equal weight of the oxide in a different form.

2. A rubber composition consisting of rubber having incorporated therein powdered hard, porous, highly adsorptive silica gel, characterized in that it has a tensile strength and elasticity much greater than that of a similar composition containing an equal weight of the silica in a different form.

In testimony whereof I hereunto affix my signature.

ERNEST B. MILLER.